Jan. 26, 1937.  R. W. NEWTON  2,069,016
WINDSHIELD WIPER MOTOR
Filed Jan. 2, 1935  2 Sheets-Sheet 2

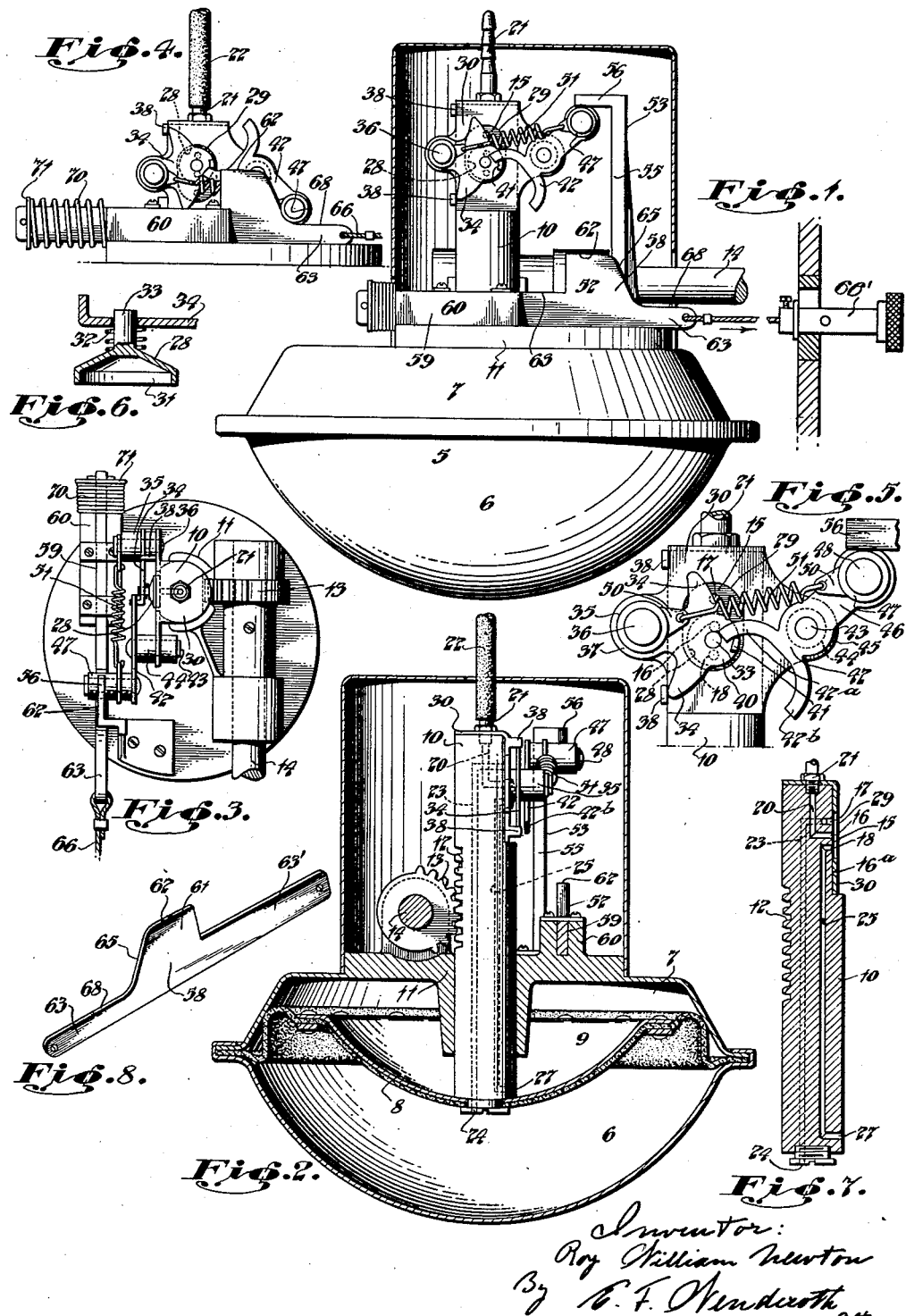

Inventor
R. W. Newton
By
E. F. Wenderoth
Atty

Patented Jan. 26, 1937

2,069,016

UNITED STATES PATENT OFFICE 2,069,016

WINDSHIELD WIPER MOTOR

Roy William Newton, Collingwood, near Melbourne, Victoria, Australia, assignor to Patent Holdings Proprietary Limited, Melbourne, Australia Application January 2, 1935, Serial No. 188
In Australia September 4, 1934

13 Claims. (Cl. 121—48)

This invention has reference to an improved windshield wiper motor and has been devised to provide a wiper motor that will be durable, comparatively cheap in manufacture and silent and efficient in operation, the invention being directed more particularly to the type of motor which may be remotely disposed from the cleaner arm operating on the wind shield, but if desired, the wiper motor may be mounted on the panel of the windshield as in past practice.

The object of this invention is to provide an improved windshield wiper motor comprising a casing with a movable member located therein with a rod attached to the movable member to actuate a spindle from which the cleaner arm may be driven while snap over valve mechanism is mounted directly on the rod to withdraw air alternately from each side of the movable member to energize the wiper motor.

A further object of the invention is to provide means to start and stop the wiper motor, said means being movable to impart the initial impulse to the snap over valve mechanism whereby it is caused to function and start the wiper motor, said means, in this position in conjunction with a fixed element effecting the continuous exciting or actuation of the said mechanism, while the displacement of said means from the actuation or exciting contact position with the snap over valve mechanism renders the same inoperative to stop the wiper motor.

A further object of the present invention is to provide a casing composed of two complemental sections between which is located a movable member having a rod to operate a spindle to impart motion to a remotely disposed cleaner arm, the said rod having mounted thereon snap over valve mechanism to be brought into contact during its movement on the rod with means to actuate or excite the said snap over valve mechanism to withdraw air alternately from each side of the movable member, the said means being adjustable in relation to the snap over valve mechanism in order to start and stop the wiper motor.

A further object of the invention is to provide mechanism for exciting the snap over valve mechanism comprising a fixed member and a movable cam member which is normally in engagement with said mechanism and is adapted when moved to the operative position to impart the initial impulse to the snap over valve mechanism to start the wiper motor, said member in this position forming a spaced exciting contact with the fixed element with which the snap over valve mechanism contacts alternately to be continuously actuated while the displacement of the cam member from its actuation position causes the snap over valve mechanism to assume the parking position with the wiper motor inoperative.

Other objects and features of the present invention will be apparent from the description in relation to the accompanying drawings:—

Figure 1 is a side elevation of a wiper motor constructed in accordance with this invention.

Figure 2 is a central section of the wiper motor with the snap over valve mechanism illustrated in elevation.

Figure 3 is a plan of the snap over valve mechanism.

Figure 4 is a view illustrating the position of the snap over valve mechanism when the wiper motor is inoperative.

Figure 5 is a detail elevation of the co-acting snap-over elements incorporated in the valve mechanism.

Figure 6 is a detail elevation of the oscillatory slide valve.

Figure 7 is a central section of the rod illustrating the valve surface and fluid passages therein.

Figure 8 is a prospective view of the cam member for adjusting the snap over valve mechanism.

Figure 9:
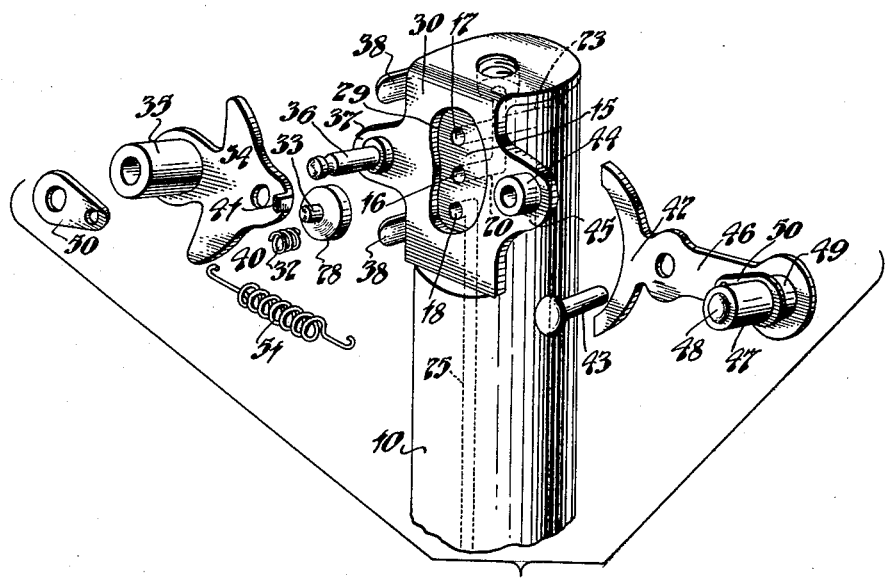
Figure 9 is an exploded perspective view of the snapover mechanism.

According to one embodiment of the invention as illustrated in Figures 1 and 2, the wiper motor comprises a casing 5 in the form of two complemental sections 6 and 7 between which is disposed a movable member 8, which in this instance is a flexible movable member preferably having a metal, cup-shaped base 9 and an outer lining of leather or other resilient material.

The movable member 8 has attached thereto a post or rod 10 which extends outwardly through a bearing 11 formed on the upper complemental section 7 of the casing; the rod 10 has formed in its exterior surface at one side thereof a rack 12 to engage with a mutilated pinion 13 carried on a spindle 14 which is adapted to operate the wiper or cleaner arm disposed on the windshield.

The type of motor herein described is suitable for remote disposal from the cleaner arm such as under the dashboard of the automobile and therefore the driven spindle 14 would have connected thereto suitable gearing for imparting the required direction of drive for a cleaner arm to reciprocate same in an arcuate manner over the windshield, but it will be understood that the wiper motor could, if desired, be mounted on the panel of the windshield in accordance with past practice and the cleaner arm would then be mounted directly on the spindle 14.

As illustrated in Figures 1 to 3, the snap over valve mechanism is mounted directly on the rod 10 of the movable member and during the reciprocation of the rod under the action of the movable member, the valve mechanism is carried on the said rod 10 and brought into engagement with actuating mechanism carried on the casing 5 and disposed in the path described by said mechanism which is adapted to withdraw air alternately from each side of the movable member 8 to effect the pulsation thereof.

The construction and disposition of the snap over valve mechanism is as follows:—

At or near the top of the rod 10 is a valve seat 15 disposed on a flat surface 16 cut on said rod, the valve seat 15 having three spaced ports therein comprising a central suction supply port 16 and two side delivery ports 17 and 18. The centre port 16 has a fluid passage 20 in communication therewith which extends upwardly through the rod 10 to connect with a union 21 having a flexible tube 22 leading to a source of suction such as the intake manifold of the engine. The upper side port 17 in the valve seat connects with an independent fluid passage 23 which extends downwardly through the rod 10 to a port 24 open to the interior of the lower complemental section 8 while the other lower side port 18 has an independent fluid passage 25 extending through the rod 10 to connect a port 27 in communication with the interior of the upper complemental section 7, that is, each port 24 and 27 in communication with the independent fluid passages 23 and 25 is disposed on either side of the movable member.

A slide valve 28 is mounted above the valve seat 15 and is adapted to oscillate over the said seat in operation within a recess 29 formed in a stamping 30 attached to the top of the rod 10.

The slide valve 28 is spring loaded to retain it on the valve seat 15 and is recessed as at 31 on its undersurface to cover two ports at once, that is, the central suction supply port 16 and one of the side suction delivery ports 17 or 18. The slide valve 28 is fitted with a stem 33 which has a spring 32 disposed thereon to impinge against an oscillatory or snap action element 34 to which the slide valve is connected to move in unison therewith.

As illustrated in Figs. 1 and 5, the element 34 is arc shaped and at the centre thereof is formed with a sleeve 35 through which is extended a pivot pin 36 seating in a flange 37 formed on the stamping 30. On each side of the flange 37 are disposed spaced upraised shoulders to form stops 38 to delimit the oscillatory or snap over movement of the said element 34 in either direction owing to the contact alternatively therewith by each side of the said element 34.

The arc-shaped element 34 adjacent to the position of connection to the stem 33 of the slide valve 28 is formed with an enlargement 40 concentric to the valve stem and formed on the enlarged concentric portion 40 is an upraised stop 41 which is in radial alignment with the pivot pin 36 of the arc-shaped element 34 and valve stem 33.

Coacting with the arc-shaped oscillatory element 34 is an opposed bifurcated oscillatory element 42 which is adapted to oscillate in an opposite manner to the arc-shaped element 34.

The bifurcated element 42 is pivotally mounted on a pin 43 carried in a bearing 44 supported on a flange 45 in the stamping 30. The stem 46 of the bifurcated member on the opposite side of its pivot 43 to the bifurcated portion has mounted thereon at right angles a roller 47 carried on a transverse pin 48 supported in a bearing attached to the stem 46 of the bifurcated element 42.

Positioned on the pivot pins of each coacting snap over element 34 and 42 is a recessed collar 50, the adjacent ends of which have attached thereto the end of the energizing spring 51 of the snap over mechanism.

The snap over mechanism (the coacting and opposed oscillatory elements 34 and 42) has combined therewith means for effecting the stopping and starting of the wiper motor and also the continuous actuation of the mechanism during the movement of the rod 10 attached to the movable member 8. The means comprises a movable actuating member 52 and fixed member 53 disposed on the upper complemental section 7 of the casing 5. The fixed member consists in a vertical bar or strap 55 with a right angled arm 56 at the top thereof positioned so as to be in the path of the roller 47 on the bifurcated oscillatory element 42 and to engage with said roller 47 when the rod 10 is on the upward stroke and when the bifurcated element 42 is inclined upwardly.

The movable actuating member 52 performs a dual function one part of which comprises controlling the action of the snap over valve mechanism in order to start or stop the wiper motor. After having performed the function of starting the wiper motor, the said member is retained in a position to cooperate with the fixed element to provide between them two spaced contacts for actuating the snap over valve mechanism as will be described.

The movable member 52 comprises a cam 58 slidably arranged in a longitudinal recess 59 formed in a bearing 60 on the surface of the upper complemental section 7 of the casing. The cam 58 is vertically disposed in the recess and is parallel to the arm of the fixed member while both the cam 58 and said arm 56 are in a plane at right angles to the axis of the roller 47 (see Figure 1).

The cam 58 is in the form of a plate with an enlarged shoulder 61 to form an actuation surface 62 integral with a reduced extension 63 and 63' at each end thereof. The shoulder 61 at one side has a cam track 65 to connect the adjacent extended portion 63 of the plate; this forward extension 63 has connected at the end thereof a cord or cable 66 for connection with a remote control device 66' or the like for moving the cam 58 within the recess 59. The upper surface or edge 68 of the reduced extension 63 of the cam forms a "parking" surface which is normally in engagement with the roller 47 to retain the snap over mechanism inoperative as illustrated in Figure 4.

The reduced extension 63' on the other end of the cam 58 is provided with a compression spring 70 impinging against a collar 71 on the end of said extension and the end of the bearing 60 whereby, as the cam 58 is moved forwardly by a pull on the cord 66, the spring 70 is compressed to effect a quick return of the cam on the release of the cord. When the wiper motor is mounted directly to the panel of the wind screen, the forward reduced extension 63 of the cam 58 could be provided with means for effecting the manipulation of same by direct hand control.

The operation of the wiper motor is as follows:—

The snap over mechanism normally occupies the parking position illustrated in Figure 4 with the wiper motor inoperative. The roller 47 on the bifurcated oscillatory element rests on the "parking" surface 68 of the cam 58. The slide valve covers the central port 16 and the side delivery port 17 whereby the movable member 8 is retained in the lower complemental section 6 with the rod 10 in the retracted position and the cleaner arm "parked."

To start the wiper motor, the cam 58 is moved outwardly in the direction of the arrow in Fig. 1 by the pull exerted on the cord 66 whereby the roller 47 is brought into contact with the cam track 65 causing the roller to ride thereon with the object of reaching the upper flat actuating surface 62 of the cam 58.

As the roller 47 rises, by the movement of the cam 58, the bifurcated oscillatory element 42 which is inclined downwardly is caused to pivot, thereby disengaging the bifurcation 42a from engagement with the stop 41 on the coacting element 34 which is inclined upwardly, inversely to the inclination of the bifurcated element 42.

As the bifurcated element 42 continues to describe its arcuate movement, under the influence of the roller 47, the spring 51 is tensioned and on the element reaching the dead centre, the spring energizes the bifurcated element 42 and effects a snap over action thereof which brings the other bifurcation 42b into engagement with the stop 41 on the arc-shaped element 34 and carries said element 34 with it in describing the completion of its arcuate movement.

By moving the cam 58 to the operative position in the manner above described, the actuation of the roller 47 by said cam imparts an initial impulse to the co-acting snap over elements 42 and 34.

The limited arcuate movement of the arc shaped element 34 is terminated by the lower stop 38 on the stamping 30 and during the movement of the arcuate element 34 as described, the slide valve 28 is simultaneously moved over the valve seat 15 to cover the central supply port 16 and the lower side delivery port 18. Suction is therefore imparted to the upper section of the casing through the medium of the fluid passage 25 in communication therewith whereby the movable member is drawn into the upper complemental section 7 which causes the rod 16 to rise and carry with it the snap over valve mechanism previously described.

The roller 47 is in its uppermost position and on the continued upward movement of the rod 10, impinges on the undersurface of the right angled arm 56 of the fixed actuating member 53 and effects a rolling contact therewith as illustrated in Figs. 1, 2, 3, and 5.

The pressure exerted by the arm 56 in preventing the further upward lift of the roller 47 with the rod 10 causes the oscillatory bifurcated element 42 to again pivot in a downward inclination and bring the lower bifurcation 42a into engagement with the stop 41 on the arcuate oscillatory element 34 simultaneously with tensioning of the spring 51 which, on the bifurcated element 34 moving past the dead centre, effects the snap over action between the coacting elements 34 and 42 through the engagement of the bifurcation 42a with the stop 41 whereby the slide valve 28 is moved to uncover the lower side delivery port 18 and cover the central supply port 16 and the upper side delivery port 17 to withdraw air once more from the lower complemental section through the open port 18.

As the movable member 8 is drawn into the lower complemental section 8, the rod 10 descends until the roller 47 contacts with the upper actuating surface 62 of the cam 58 which is in the operative position.

On contact being established between the roller 47 and the actuating contact surface 62 of the cam, the continued descent of the rod 10 causes the roller 47, which is held stationary, to effect the upward pivot of the bifurcated oscillatory element 42 whereby the coacting snap over between the bifurcated element 42 and the arcuate element 34 is again effected as previously described, the slide valve 28 is moved to again cover the ports 16 and 18 whereby air is withdrawn from the upper complemental section 7, the cycle of operations being continuous. The rod 10 would therefore rise once more and in continuity performs a vertical reciprocative movement as air is withdrawn alternately from each side of the movable member 8 which is accordingly energized with a pulsating motion within the casing 5.

During the reciprocative movement of the rod 10, the rack 12 imparts an oscillatory motion to the pinion 13 in engagement therewith so that a corresponding oscillatory rotation is effected to the driven spindle 14 to be converted into an arcuating reciprocative motion by the cleaner arm on the wind shield.

The cam 58 is retained in the operative position whereby the actuation surface 62 in conjunction with the right angled arm 56 on the fixed member 53 forms two spaced and aligning contacts to engage alternately with the roller 47 of the snap over mechanism to effect the continuous actuation thereof during the reciprocative movement of the rod 10.

To stop the wiper motor, the cord 66 is released and the cam will retire under the influence of the compression spring 70; the reduced "parking" surface 68 is therefore brought into vertical alignment with the path described by the roller 47 while the actuation surface 62 of said cam is disposed out of alignment with said roller which is illustrated in Figs. 1 and 2. As the rod 10 descends carrying with it the snap over mechanism, the roller 47 in the absence of the actuating surface 62 merely comes to rest on the parking surface 68 of the cam simultaneously with the rod coming stationary in its maximum entry into the casing 5. As the rod 10 does not continue to move downwardly when the roller 47 impinges on the "parking" surface 68 of the cam 58, the said roller is not energized and therefore the snap over valve mechanism is rendered inoperative, to stop the wiper motor. The cam 58 in operation serves to impart the initial impulse to the snap over mechanism to start the wiper motor and during the operation of the motor coacts with the fixed member 53 to continuously excite the said mechanism while the displacement of the cam from the operative position causes the snap over mechanism to become inoperative to stop the wiper motor.

What I claim as my invention and desire to secure by Letters Patent is—

1. An improved windshield wiper motor, comprising a casing, a movable member located in said casing forming separate chambers defined by said member and said casing, a rod attached to said movable member to operate a cleaner arm, snapover mechanism mounted on said rod, a valve connected to and operable by said mechanism, a valve seat formed on said rod over which said valve oscillates in operation, ports formed in said valve seat and connected by passages with said chambers and a source of suction, said ports being controlled by said valve, air being withdrawn through said ports and passages under the control of said valve alternately from each side of said movable member, and atmospheric air being supplied through said ports and passages alternately to the opposite sides of said movable member, and means on the casing to actuate the snapover mechanism during the movement of said rod in both directions, said means including means for imparting the initial actuation to the snapover mechanism to permit the wiper motor to start.

2. An improved windshield wiper motor, comprising a casing, a movable member located in said casing forming separate chambers defined by said member and said casing, a rod attached to said movable member to operate a cleaner arm, snapover mechanism mounted on said rod, a valve connected to and operable by said mechanism, a valve seat formed on said rod over which said valve oscillates in operation, ports formed in said valve seat and connected by passages with said chambers and a source of suction, said ports being controlled by said valve, air being withdrawn through said ports and passages under the control of said valve alternately from each side of said movable member, and atmospheric air being supplied through said ports and passages alternately to the opposite sides of said movable member, and means on the casing to actuate the snapover mechanism during the movement of said rod in both directions, said means including means for bringing the snapover mechanism out of and into its operable condition to stop and start the wiper motor respectively.

3. An improved windshield wiper motor, comprising a casing, a movable member located in said casing forming separate chambers defined by said member and said casing, a rod attached to said movable member to operate a cleaner arm, snapover mechanism mounted on said rod, a valve connected to and operable by said mechanism, a valve seat formed on said rod over which said valve oscillates in operation, ports formed in said valve seat and connected by passages with said chambers and a source of suction, said ports being controlled by said valve, air being withdrawn through said ports and passages under the control of said valve alternately from each side of said movable member, and atmospheric air being supplied through said ports and passages alternately to the opposite sides of said movable member, a fixed actuating member on the casing disposed in the path of movement of the snapover mechanism to contact and snap said mechanism near one extreme position of its travel, and a movable actuating member serving as a stop for said mechanism near the other extreme position of its travel, said last two mentioned members actuating the snapover mechanism during the movement of said rod in both directions, the displacement of the movable actuating member from the position of actuation being adapted to render the said snapover mechanism inoperative to permit the wiper motor to stop.

4. In an improved windshield wiper motor, a casing, a movable member located in said casing forming separate chambers defined by said member, a rod attached to said movable member to operate a cleaner arm, snapover mechanism mounted directly on said rod to move therewith, a valve connected to said mechanism, a valve seat formed on said rod over which said valve oscillates in operation, ports formed in said valve seat and connected by passages with said chambers and a source of suction, said ports being controlled by said valve, air being withdrawn through said ports and passages under the control of said valve alternately from each side of said movable member, and atmospheric air being supplied through said ports and passages alternately to the opposite sides of said movable member, a fixed actuating member on said casing disposed in the path of movement of the snapover mechanism, to limit the movement of the latter in one direction, and a movable actuating member serving as a stop slidably disposed on said casing to limit the movement of said snapover mechanism in the other direction, the fixed actuating member and the movable actuating member serving to actuate in both directions snapover mechanism during the movement of said rod, said movable actuating member being adjustable in relation to said snapover mechanism, to respectively start and stop the wiper motor.

5. An improved windshield wiper motor, comprising a casing, a movable member located in said casing forming separate chambers defined by said member and said casing, a rod attached to said movable member to operate a cleaner arm, snapover mechanism mounted on said rod, a valve connected to and operable by said mechanism, a valve seat formed on said rod over which said valve oscillates in operation, ports formed in said valve seat and connected by passages with said chambers and a source of suction, said ports being controlled by said valve, air being withdrawn through said ports and passages under the control of said valve alternately from each side of said movable member, and atmospheric air being supplied through said ports and passages alternately to the opposite sides of said movable member, and means on said casing to actuate said snapover mechanism during the movement in both directions of said rod with said mechanism, part of said means to actuate the snapover mechanism being movable into and out of the path of the snapover mechanism to respectively start and stop the motor, movement into the path of the mechanism initially snapping over the said mechanism to impart an initial movement to the latter to permit the wiper motor to start.

6. An improved windshield wiper motor, comprising a casing, a movable member located in said casing forming separate chambers defined by said member and said casing, a rod attached to said movable member, snapover mechanism mounted on said rod, a valve actuatable by said mechanism, a valve seat formed on the rod over which said valve oscillates in operation, ports formed in said valve seat and connected by passages with said chambers and a source of suction, said ports being controlled by said valve, air being withdrawn through said ports and passages under the control of said valve alternately from each side of said movable member, and atmospheric air being supplied through said ports and passages alternately to the opposite sides of said movable member, a fixed actuating member mounted on said casing for contacting with said mechanism near one of its extreme positions of travel, and a movable actuating member capable of contacting with said mechanism near its other extreme position, the said two members engaging alternately with the snapover mechanism during the movement of said rod in both directions to effect the operation of said mechanism, said movable actuating member being removable from the path of the snapover mechanism, at will of the operator to stop the wiper motor.

7. An improved windshield wiper motor, comprising a casing, a movable member located in said casing forming separate chambers defined by said member and said casing, a rod attached to said movable member, snapover mechanism mounted on said rod, a valve connected to and operable by said mechanism, a valve seat formed on said rod over which said valve oscillates in operation, ports formed in said valve seat and connected by passages with said chambers and a source of suction, said ports being controlled by said valve, air being withdrawn through said ports and passages under the control of said valve alternately from each side of said movable member, and atmospheric air being supplied through said ports and passages alternately to the opposite sides of said movable member, a fixed member on said casing, a movable actuating member slidably mounted on said casing, an actuation or stop surface on said movable member to actuate the snapover mechanism in conjunction with the fixed member adjacent the limit positions of said mechanism during the movement of said rod in both directions and a "parking" surface on said movable member with which the said mechanism is brought into engagement when said movable member is displaced from the actuation position, to render the wiper motor inoperative.

8. An improved windshield wiper motor, comprising a casing, a movable member located in said casing forming separate chambers defined by said member and said casing, a rod attached to said movable member, snapover mechanism mounted directly on said rod, a valve connected to and operable by said mechanism, a valve seat formed on said rod over which said valve oscillates in operation, ports formed in said valve seat and connected by passages with said chambers and a source of suction, said ports being controlled by said valve, air being withdrawn through said ports and passages under the control of said valve alternately from each side of said movable member and atmospheric air being supplied through said ports and passages alternately to the opposite sides of said movable member, a spring controlled actuating member slidably mounted on said casing and serving in its operable position as a stop, an actuation stop surface on said actuating member to contact with the snapover mechanism during its movement with said rod, a cam surface connected with the actuation surface, a "parking" surface on said actuating member connected with the cam surface and disposed in a lower plane than the actuation surface, said "parking" surface being adapted to normally engage with the snapover mechanism, and manually operable means to move said actuating member relatively to said mechanism to slide the contacting portion of the snapover mechanism up said cam surface when the actuating member is moved laterally into its operable position, to snap the mechanism due to temporary immobility of said rod, to permit the wiper motor to start.

9. In an improved windshield wiper motor according to claim 8, a spring connected with the movable actuating member to displace the actuation surface of said member from its operable position on the release of the manually operable means, to cause the contacting portion of the snapover mechanism to engage with the "parking" surface to render the wiper motor inoperative.

10. A windshield wiper motor, comprising a casing, a movable member located in said casing forming separate chambers defined by said member and said casing, a rod attached to said movable member and movable therewith, snapover mechanism mounted on said rod and movable therewith, a valve connected to and operable by said mechanism, a valve seat formed on said rod over which said valve oscillates in operation, ports formed in said valve seat and connected by passages with said chambers and a source of suction, said ports being controlled by said valve to connect said suction source to one or the other of said chambers at all times, and atmospheric air being supplied through said ports and passages to one or the other of said chambers to allow the suction to be operative on the movable member, a fixed actuating member on said casing and interposed in the path of said snapover mechanism to limit its movement in one direction, continued movement of said rod in the same direction under the actuation of said movable member causing said fixed actuating member to snap the snapover mechanism over, to connect the source of suction through said ports and passages to the other chamber to cause the rod to return, and an actuating member on said casing movable at the will of the operator into the path of said snapover mechanism near its other extreme position of movement, to cause the snapover mechanism to snap over at that point of its travel, movement of the movable actuating member to its inoperative position permitting the snapover mechanism to follow the rod to the extreme position of the movable member without snapping over said mechanism so that vacuum is constantly applied to the one chamber, and the member, rod, and wiper arm are held in their extreme position.

11. A windshield wiper motor, comprising a casing, a movable member located in said casing forming separate chambers defined by said casing and said member, a rod attached to said movable member and movable therewith, snapover mechanism mounted on said rod and movable therewith, a valve connected to and operable by said mechanism, a valve seat formed on said rod over which said rod oscillates in operation, ports formed in said valve seat and connected by passages with said chambers and a source of suction, said ports being controlled by said valve, to connect said suction source to one or the other of said chambers at all times, and atmospheric air being supplied through said ports and passages to one or the other of said chambers to allow the suction to be operative on the movable member, a fixed actuating member on said casing and interposed in the path of said snapover mechanism to limit its movement from one direction, continued movement of said rod in the said direction under the actuation of said movable member causing said fixed actuating member to snap the snapover mechanism over, to connect the source of suction to the other chamber to cause the rod to return, and a movable actuating member on said casing movable at the will of the operator into the path of said snapover mechanism near its other extreme position of movement to cause the snapover mechanism to snap over at that point of its travel with said rod, movement of the movable actuating member to its inoperative position permitting the snapover mechanism to follow the rod to the extreme position of the movable member without snapping over said snapover mechanism so that suction is constantly applied to one chamber, and the member and rod are held in their extreme position.

12. An improved windshield wiper motor, comprising a casing, a diagram located in said casing forming separate chambers defined by said diaphragm, a rod attached to said diaphragm to operate a cleaner arm, snapover mechanism mounted on said rod exteriorly of said casing, a valve connected to and operable by said mechanism, a valve seat formed in said rod over which said valve oscillates in operation, ports formed in said valve seat and connected by passages with said chambers and a source of suction, and means on said casing to actuate the snapover mechanism during the movement of the said rod in both directions to permit said valve to withdraw air through said ports alternately from each side of the diaphragm.

13. An improved windshield wiper motor, comprising a casing, a diaphragm located in said casing forming separate chambers defined by said diaphragm, a rod attached to said diaphragm to operate a cleaner arm, snapover mechanism mounted on said rod exteriorly of said casing, a valve connected to and operable by said mechanism, a valve seat formed in said rod over which said valve oscillates in operation, ports formed in said valve seat and connected by passages with said chambers and to a source of suction, air being withdrawn through said ports and passages under the control of said valve alternately from each side of the diaphragm, and atmospheric air being supplied through said ports and passages alternately to the opposite sides of said diaphragm, and means on the casing to actuate the snapover mechanism during the movement of the rod in both directions, said means including means for imparting the initial actuation to the snapover mechanism to permit the wiper motor to start.

ROY WILLIAM NEWTON.